(12) United States Patent
Doron et al.

(10) Patent No.: US 11,989,255 B2
(45) Date of Patent: May 21, 2024

(54) CLIENT-SIDE SORTING AND UPDATING OF PAGINATED DATA OBTAINED FROM A SERVER

(71) Applicant: monday.com Ltd., Tel Aviv (IL)

(72) Inventors: Omer Doron, Tel Aviv (IL); Liran Brimer, Ramat Gan (IL); Dor Yehuda, Hod Hasharon (IL); Eviathar Moussaffi, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 8 days.

(21) Appl. No.: 17/565,767

(22) Filed: Dec. 30, 2021

(65) Prior Publication Data
US 2023/0214442 A1 Jul. 6, 2023

(51) Int. Cl.
| | | |
|---|---|---|
| G06F 16/958 | (2019.01) | |
| G06F 16/901 | (2019.01) | |
| G06F 16/9535 | (2019.01) | |
| G06F 16/957 | (2019.01) | |

(52) U.S. Cl.
CPC ........ *G06F 16/958* (2019.01); *G06F 16/9024* (2019.01); *G06F 16/9535* (2019.01); *G06F 16/957* (2019.01)

(58) Field of Classification Search
CPC .. G06F 16/958; G06F 16/957; G06F 16/9535; G06F 16/9024
USPC ........................................................ 707/722
See application file for complete search history.

(56) References Cited

U.S. PATENT DOCUMENTS

| | | | | |
|---|---|---|---|---|
| 6,374,241 | B1 * | 4/2002 | Lamburt | G06F 16/954 |
| | | | | 707/999.005 |
| 7,526,481 | B1 * | 4/2009 | Cusson | G06F 16/9574 |
| 7,644,366 | B1 * | 1/2010 | McKinney | G06F 16/2428 |
| | | | | 715/743 |
| 9,519,664 | B1 * | 12/2016 | Kharatishvili | G06F 16/27 |
| 2004/0111302 | A1 * | 6/2004 | Falk | G06Q 40/00 |
| | | | | 705/4 |
| 2007/0198584 | A1 * | 8/2007 | Vienneau | G06Q 10/10 |
| 2008/0065688 | A1 * | 3/2008 | Shenfield | G06F 16/958 |
| 2008/0163193 | A1 * | 7/2008 | Hayton | G06F 16/9574 |
| | | | | 717/173 |
| 2008/0320050 | A1 * | 12/2008 | Chan | G06F 16/972 |
| 2011/0191407 | A1 * | 8/2011 | Fu | G06F 8/38 |
| | | | | 709/203 |
| 2012/0265939 | A1 * | 10/2012 | Amar | G06F 16/2329 |
| | | | | 711/130 |
| 2012/0311424 | A1 * | 12/2012 | Bobykin | G06F 16/9577 |
| | | | | 715/221 |

(Continued)

FOREIGN PATENT DOCUMENTS

WO    WO-2017215175 A1 * 12/2017

*Primary Examiner* — Amy Ng
*Assistant Examiner* — Antonio J Caiado

(57) ABSTRACT

There is provided a system for client-side updating and sort of a page of a dataset, comprising: at least one processor of a client terminal executing a code for: accessing a server to obtain a page of a dataset comprising a plurality of pages, wherein the dataset is sorted according to a sort operation, wherein other pages of the plurality of pages are not provided to the client terminal, presenting the page on a display of the client terminal, receiving at least one update message for updating of a value of the page, applying the update to the page to create an updated page, re-executing the sort operation on the updated page, and presenting the sorted updated page.

20 Claims, 8 Drawing Sheets

(56) References Cited

U.S. PATENT DOCUMENTS

| | | | |
|---|---|---|---|
| 2015/0220940 A1* | 8/2015 | Tuteja | G06Q 30/0201 |
| | | | 705/7.29 |
| 2016/0019228 A1* | 1/2016 | Hong | G06F 16/2246 |
| | | | 707/624 |
| 2018/0088758 A1* | 3/2018 | Zearing | G06F 3/0481 |
| 2018/0260125 A1* | 9/2018 | Botes | G06F 3/0617 |
| 2018/0309807 A1* | 10/2018 | Smith | G06F 3/0482 |
| 2021/0397776 A1* | 12/2021 | Abrahami | G06F 3/0486 |
| 2022/0058183 A1* | 2/2022 | Duffield | G06F 16/2379 |
| 2022/0058194 A1* | 2/2022 | Elliot | G06F 16/24534 |

* cited by examiner

CLIENT-SIDE SORTING AND UPDATING OF PAGINATED DATA OBTAINED FROM A SERVER

RELATED APPLICATIONS

The present application is related to and co-filed with U.S. patent application Ser. No. 17/565,697 filed on Dec. 30, 2021, now U.S. Pat. No. 11,409,956, and also with U.S. patent application Ser. No. 17/565,731 filed on Dec. 30, 2021, now U.S. Pat. No. 11,537,595. The contents of the above patents are incorporated herein by reference in their entirety.

BACKGROUND

The present invention, in some embodiments thereof, relates to client-server interactions and, more specifically, but not exclusively, to datasets hosted by the server and accessed by a client terminal.

A client terminal accesses a data set hosted by a server using a web browser. The server sends the entire dataset to the client terminal, for local storage. The web browser is used by a user to scroll over the locally stored dataset.

SUMMARY

According to a first aspect, a system for client-side updating and sort of a page of a dataset, comprises: at least one processor of a client terminal executing a code for: accessing a server to obtain a page of a dataset comprising a plurality of pages, wherein the dataset is sorted according to a sort operation, wherein other pages of the plurality of pages are not provided to the client terminal, presenting the page on a display of the client terminal, receiving at least one update message for updating of a value of the page, applying the update to the page to create an updated page, re-executing the sort operation on the updated page, and presenting the sorted updated page.

According to a second aspect, a method for client-side updating and sort of a page of a dataset, comprises: accessing a server to obtain a page of a dataset comprising a plurality of pages, wherein the dataset is sorted according to a sort operation, wherein other pages of the plurality of pages are not provided to the client terminal, presenting the page on a display of the client terminal, receiving at least one update of a value of the page, applying the update to the page to create an updated page, re-executing the sort operation on the updated page, and presenting the sorted adapted page.

According to a third aspect, a non-transitory medium storing program instructions for client-side updating and sort of a page of a dataset, which, when executed by at least one hardware processor of a client, cause the at least one processor to: access a server to obtain a page of a dataset comprising a plurality of pages, wherein the dataset is sorted according to a sort operation, wherein other pages of the plurality of pages are not provided to the client terminal, present the page on a display of the client terminal, receive at least one update of a value of the page, apply the update to the page to create an updated page, re-execute the sort operation on the updated page, and present the sorted adapted page.

In a further implementation form of the first, second, and third aspects, further comprising code for: receiving, from the server, an indication of the other pages of the plurality of pages, generating placeholders for the other pages of the plurality of pages, scrolling the placeholders of the other pages, and in response to a stop of the scrolling on a certain page comprising placeholders, obtaining data of certain page from the server according to the placeholders of the certain page, replacing data of the placeholders of the certain page with the obtained data of the certain page, and presenting the page with replaced data.

In a further implementation form of the first, second, and third aspects, the presenting the page, the receiving the at least one update, the applying the update, the re-executing the sort, and the presenting the sorted, are performed on the page with replaced data.

In a further implementation form of the first, second, and third aspects, further comprising code for: storing an update message indicating an update for a certain page not obtained by the client terminal and having placeholders, determining when the stored update message is for the page with replaced data, applying the update to the page with replaced data, re-executing the sort on the updated page with replaced data, and presented the sorted updated page with replaced data.

In a further implementation form of the first, second, and third aspects, placeholders corresponding to a beginning and ending of pages of the dataset indicate the corresponding values of the pages of the dataset stored by the server, and wherein the page associated with the update messages is determined according to the values of the beginning and ending of pages.

In a further implementation form of the first, second, and third aspects, further comprising code for: in response a determination that the update message is non-associated with an existing page having existing placeholders, merging pages using existing placeholders to create a merged page, and allocating the update message to the merged page.

In a further implementation form of the first, second, and third aspects, the dataset is not updated in near real time by the at least one update message.

In a further implementation form of the first, second, and third aspects, further comprising code for triggering an update of the dataset by a server, wherein the server updates the dataset by applying a plurality of update messages since a previous update, and applying a query and/or sort operation to the dataset updated with the update messages, where the client terminal obtains pages of the updated dataset from the server.

In a further implementation form of the first, second, and third aspects, further comprising code for performing a synchronization, by obtained previously sent update messages that have not yet been received by a client terminal from a queue external to the client terminal, and applying the obtained previously sent update messages.

In a further implementation form of the first, second, and third aspects, values of the page presented on the display, which are not impacted by the at least one update message, are maintained and not updated.

In a further implementation form of the first, second, and third aspects, a same update message is sent to each one of a plurality of client terminal, presenting a different page of the dataset and/or applying a different sort operation to the presented page.

In a further implementation form of the first, second, and third aspects, the dataset hosted by the server is managed as a combination of a speed layer and a batching layer, the speed layer documenting accumulated changes to cells occurring during a current time interval, the batching layer documenting accumulated historical changes to cells, wherein in response to a current time interval iteratively elapsing, the batching layer is iteratively updated with the accumulated changes documented by the speed layer.

In a further implementation form of the first, second, and third aspects, in response to a request from the client terminal to access a page of the dataset, the page of the dataset is provided to the client terminal by computing real time values of cells as a combination of historical updates documented in the batching layer and recent changes documented in the speed layer.

In a further implementation form of the first, second, and third aspects, the at least one update message sent to the client terminal is computed from a combination of a real time value of a cell documented in the speed layer corresponding to the page and a historical value of the cell documented in the batching layer corresponding to the page.

In a further implementation form of the first, second, and third aspects, the server is configured for accessing a relational graph to identify at least one second cell of at least one second dataset dependent on the at least one first cell of the dataset, wherein a page of the at least one second dataset is loaded on the client terminal, and computing an update to the at least one second cell in response to a change to the at least one first cell, wherein the at least one update message comprising the update to the at least one second cell is sent to the client terminal.

In a further implementation form of the first, second, and third aspects, the change to the at least one first cell is selected from a group consisting of: direct a change of a value of the first cell, an indirect change of the value of the first cell due to a change of another cell linked to the first cell, a configuration change impacting the first cell, a change in linkage of the first cell, a change of time used for computation by the first cell, a change in entity assigned to the first cell, a change in a definition of an automated task impacting the first cell, and a force recalculation of a formula impacting the first cell.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

Figure 1:
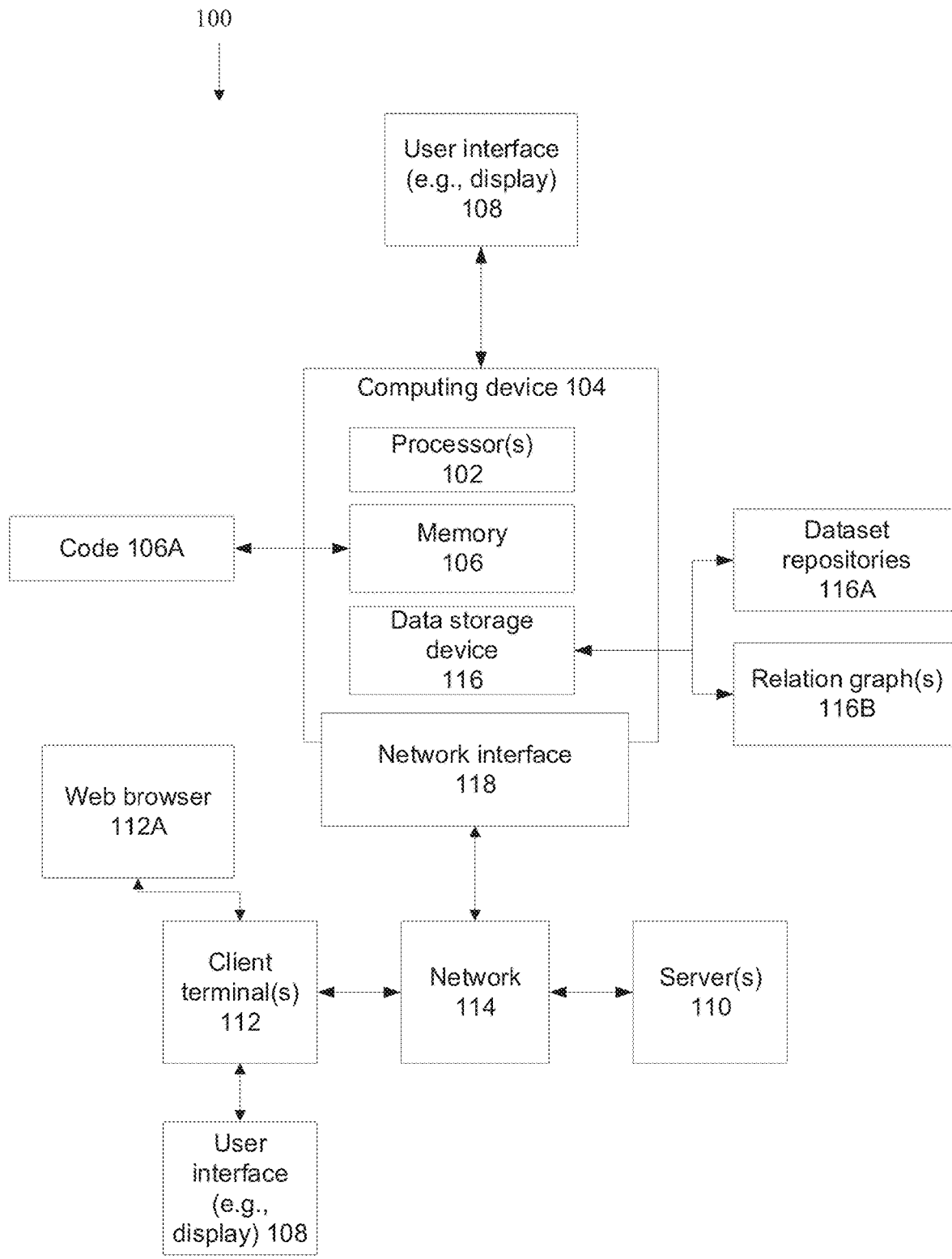
FIG. 1 is a block diagram of a system for client-side updating and/or sort of a page of a dataset and/or scrolling of the dataset, in accordance with some embodiments of the present invention.

The present invention, in some embodiments thereof, relates to client-server interactions and, more specifically, but not exclusively, to datasets hosted by the server and accessed by a client terminal.

An aspect of some embodiments of the present invention relates to systems, methods, devices, and/or code instructions (e.g., stored on a memory and executable by one or more hardware processors) for client-side sort of a page of a dataset. The client accesses a server to obtain a page of multiple pages of a dataset. The page is accessed according to what is to be presented on a display of the client terminal, for example, by the browser. The dataset managed by the server may be stored in a cache, created from a main dataset by applying a query operation provided by the client terminal and/or another source. The dataset may include cells, arranged into rows and/or columns. The page is provided from the cache copy. Other pages, which are not currently for presentation on the display of the client terminal, are not provided to the client terminal, and/or are not requested by the client terminal. The provided page is presenting on a display of the client terminal. One or more update messages indicating one or more updates to a value (e.g., to a cell) of the page are received by the client terminal. When the update is for data presented on the page (e.g., a certain cell of the page), the update is applied to the page to create an updated page. A sort operation is executed (or re-executed) by the client terminal on the updated page. The sorted updated page is presented on the display. This enables scaling of the dataset to large sizes that may include, for example, one or more tables that includes thousands (or tens of thousands, or hundreds of thousands, or more) of rows and/or columns, without overloading the client terminal and/or server with excessive computations.

Optionally, placeholders indicating other pages of the dataset are provided, optionally with the page. The placeholders indicate, for example which rows are on which other pages. The values of the other pages are not provided, until specifically requested by the client terminal, such as in response to a scroll operation.

The client terminal may apply a scroll operation for scrolling the dataset. The scroll operation is applied on the placeholders. When scrolling stops, the client terminal requests the page to be presented on the display from the server, according to the place holders. The updates are applied to the currently presented page, and the sort is applied to the updated currently presented page.

Updates may arrive for other pages which are not presented on the client terminal, and for which actual data is not stored on the client terminal, but rather placeholders are used. The page for which the update is destined may be determined using values (e.g., of rows) indicating the start and end of each page. When the update is destination is for a row locates between the end of one page and the beginning of a next page, the one page and the next page are merged, and the update is inserted at the appropriate location. The update is applied when the scroll operation reaches the page to which the update is assigned.

It is noted that the term browser is not necessarily limiting, and is used as an exemplary implementation for viewing and scrolling the dataset. Other approaches may be used.

At least some implementations of the systems, methods, apparatus, and/or code instructions described herein address the technical problem of improving computational efficiency of a server hosting a dataset accessed by one or more client terminals, and/or enabling a client terminal to scroll and/or sort a large dataset. At least some implementations of the systems, methods, apparatus, and/or code instructions described herein improve the technical field of client-server interactions. Using standard approaches, in response to the client terminal accessing a server, the server sends the entire dataset to the client terminal. A user may use a web browser to scroll through the dataset. Queries on the dataset are iteratively re-executed on the dataset, server side, or client side. The dataset is iteratively updated in near real time, to account for dynamically changing cells, for example, mirror cells that monitor other cells, and/or cells that aggregate data from other cells. When the dataset is large, the re-execution of the queries server-side and/or client-side, incurs long latency, in particular when the entire dataset is being re-computed and then re-sent by the server. This results in an impractical user experience, where scrolling is very slow.

At least some implementations of the systems, methods, apparatus, and/or code instructions described herein provide a solution to the technical problem, and/or improve the technical field, by having the server manage the dataset, and sending pages of the dataset to the client according to what the browser of the client is currently presented, and/or according to a scroll action of the browser. This greatly reduces the amount of data that is being sent from the server to the client. Updates to the page are sent to the client terminal, which locally updates the page being presented (e.g., in near real time), and re-sorts the updated presented page (e.g., in near real time). This reduces the computational burden of updates by the server—the server does not necessarily update its copy of the dataset in near real time (e.g., performs an occasional batch update). Re-execution of the query on the dataset is not done in near real time when the dataset is not updated for each message. The computational burden of updates and/or sort by the client is reduced, since the updates and/or sort are applied to the presented page, and not yet to other non-presented pages (until those pages are scrolled to and require presentation). Moreover, the memory burden on the client is reduced, since the entire dataset is not sent initially, but is sent page-wise according to the page being viewed by scrolling.

In some embodiments, the server manages the dataset for generating the update message sent to the client terminal, for example, by handling dynamic updates of cell values, updates of cells dependent on the changing cells, and application of operations such as filter and/or query. Having the server, rather than the client, manage the dataset, while sending updates of affected cells for presentation by the client terminal in response to the scroll, reduces latency and increases user experience, by providing fast real time scrolling of the dataset. The reduced latency and/or increased real experience results from, for example, reduced traffic on the network between the server and client terminal, and/or increased computational efficiency of the client terminal (e.g., reduced processing resource utilization, reduced memory utilization, reduction in computations, and reduction in processing time).

At least some implementations of the systems, methods, apparatus, and/or code instructions (stored on a data storage device and executable by one or more hardware processors) described herein address the technical problem of providing scalability to client terminals accessing datasets stored on a server. The datasets may be referred to herein as boards, which may be implemented as rows and columns of cells. For example, each row is for a different entity, and the columns are for different properties, where each cells of each column are for a specific property of the multiple entities. The technical problem may relate to increasing computational efficiency of the client terminal that is presenting the board and/or of the server that is providing pages of the board. The technical problem may relate to providing and/or managing and/or sorting and/or scrolling extremely large boards, for example, with millions of rows and thousands of columns, in contrast, for example, to standard approaches where board size is much more limited. The technical problem may relate to providing a scalable architectures that supports one or more of: automation on aggregation of formula (e.g., applied to a column), scroll (e.g., pagination) with sort and filter, fast dashboards, interface (e.g., API) for aggregations and/or aggregation changes, and formula for third party developers (e.g., apps). The technical problem may relate to providing fast user experience in accessing the board and/or performing operations using the boards, for example, the user changes a value of a cell, and linked cells are quickly updated, or for example, the user applied a sort to a large board, and is able to scroll across the large board and view updated sorted data without a significant noticeable delay (e.g., less than about 0.1 seconds, or 0.5 second, 1 second, or 2 seconds, or other values).

Using existing approaches, the entire dataset is sent over a network to each client terminal accessing the dataset. The dataset is locally saved by each client terminal. The dataset locally stored by the client terminal is accessed by the browser running on the client terminal, for location presentation, sort, scroll, and manipulation by the client terminal. Manipulations of the dataset, for example, sort, filter, accumulation operations, and execution of automated tasks, are performed by a respective browser on each respective client terminal. Such architecture performs efficiently for small datasets, where the network is able to transfer the dataset within a reasonable amount of time, and the processing hardware and storage device (e.g., memory) of the client terminal is able to present and process the dataset within a reasonable amount of time. However, increased size of the dataset slows down the client terminal, limiting the size of the board that may be practically implemented. Latency, due to the network sending the dataset and/or capability of the processing hardware and/or memory of the client terminal executing the dataset, increases as the board size increases and/or as complexity of the board increases, resulting in an impractical user experience where a user changes a value of a cell, and needs to reload the board and/or wait for a long time until linked cells are updated. Complexity of the board relates to, for example, cross board links where cells of one board mirror cells of another board, formulas that depend on values computed by multiple cells, aggregation functions that depend on values computed by multiple cells, and linkage between cells, where a single mirror cells monitors values of multiple cells, and/or where a single cell is monitored by multiple mirror cells which may be on different boards. Such complex interactions between cells do not scale well using standard approaches.

Use cases that involve large boards and/or complex interactions within the board cannot be practically implemented, for example, CRM lead boards that generate thousands of new leads per day, e-commerce websites that wish to manage their sales to analyze data using filters and build real time dashboards, factories/companies/other organizations that wish to manage complex production workflows using large connected boards.

At least some implementations of the systems, methods, apparatus, and/or code instructions described herein provide a solution to the above mentioned technical problem(s) and/or improve the technical field of management of datasets, by providing scalable datasets, for example, on the order of millions of rows and/or thousands of columns. The solution and/or improvement is based on storage of the dataset by the server, and execution of computations by the server, rather by the client terminal, and transmitting the relevant results from the server to the client, rather than having the client terminal re-load the entire dataset and/or re-compute a large amount of computations. Functions, for example, filtering, aggregation of data, and execution of automated tasks, are performed by the server, with the end result being provided to the client terminal, rather than the functions being performed by the client terminal. Scrolling is handled by the client requesting specific pages that are being viewed from the server, using placeholders for pages that have not yet been obtained for the server to enable scrolling, updating data of the board in near real time as updates are received, and/or sorting the presented portion of the board while the rest of the data that is not presented remains unsorted.

Exemplary improvements include: enabling very large boards to be accessed and implemented by one or more client terminals (e.g., millions of rows and/or thousands of columns), filter and/or sort on any column combination, mutable data, low latency, pagination, availability of the dataset, reliability of the dataset, aggregation on server-side, fast load time on the client terminal even for very large boards, calculating mirror and formula cells by the server, allowing to filter and sort calculated columns, and exposing formula and aggregations to automations and third party developers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
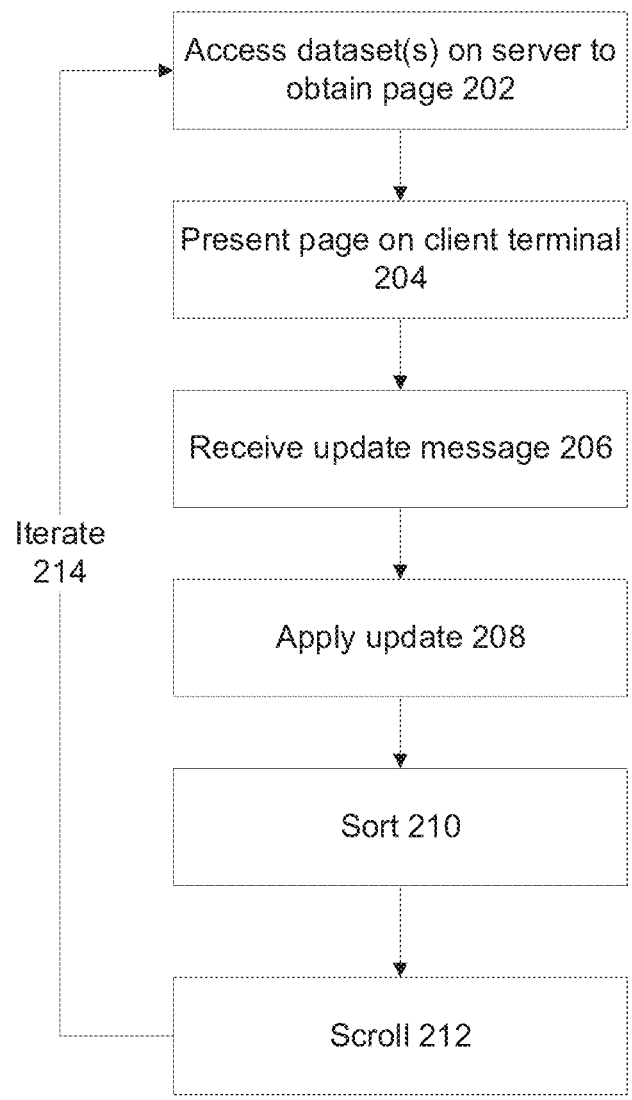
FIG. 2 is a flowchart of a method of client-side updating and/or sort of a page of a dataset and/or scrolling of the dataset, in accordance with some embodiments of the present invention.
Figure 3:
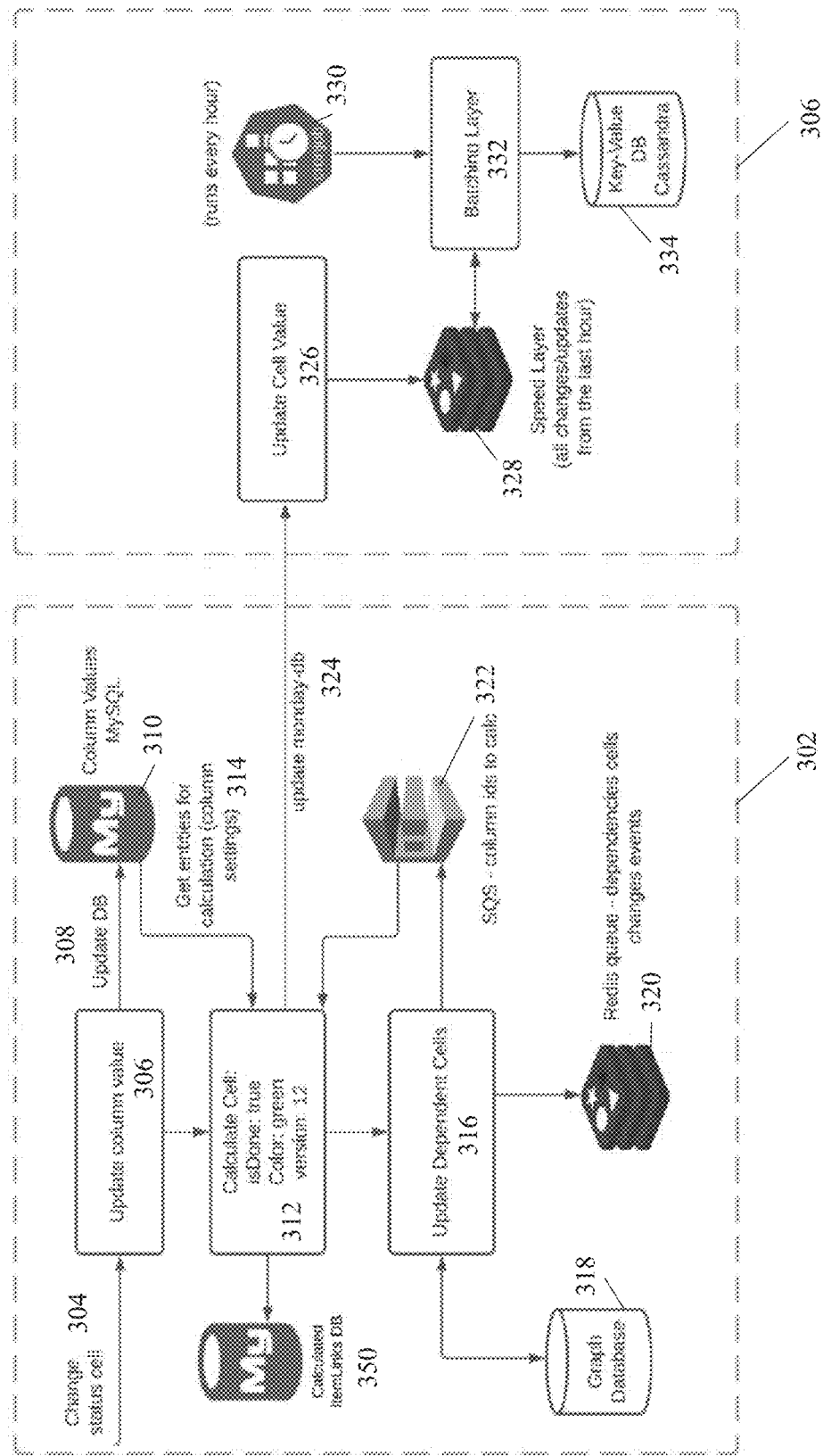
FIG. 3 is a high level exemplary dataflow of exemplary triggers in response to a change in cell status, in accordance with some embodiments of the present invention.
Figure 4:
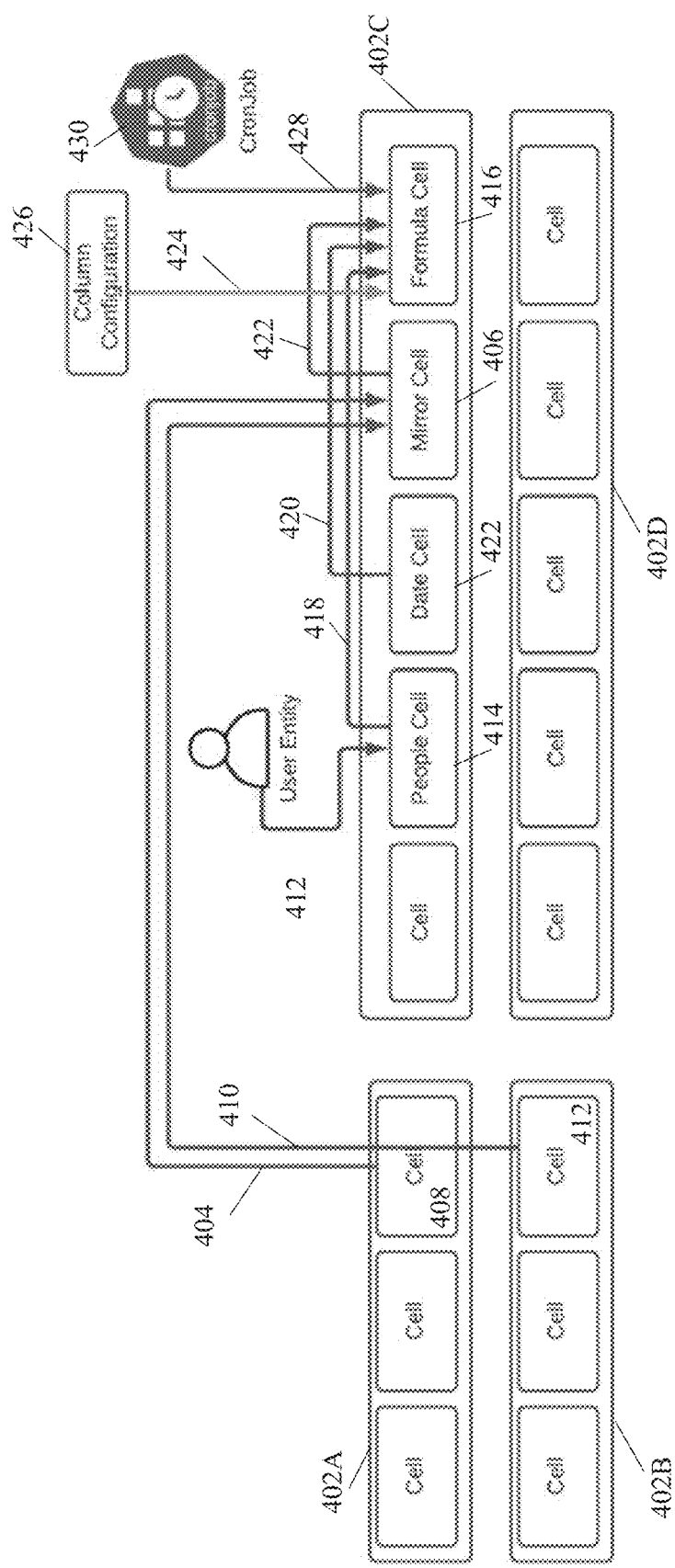
FIG. 4 depicts examples of dependencies documented in the relational graph, in accordance with some embodiments of the present invention.
Figure 5:
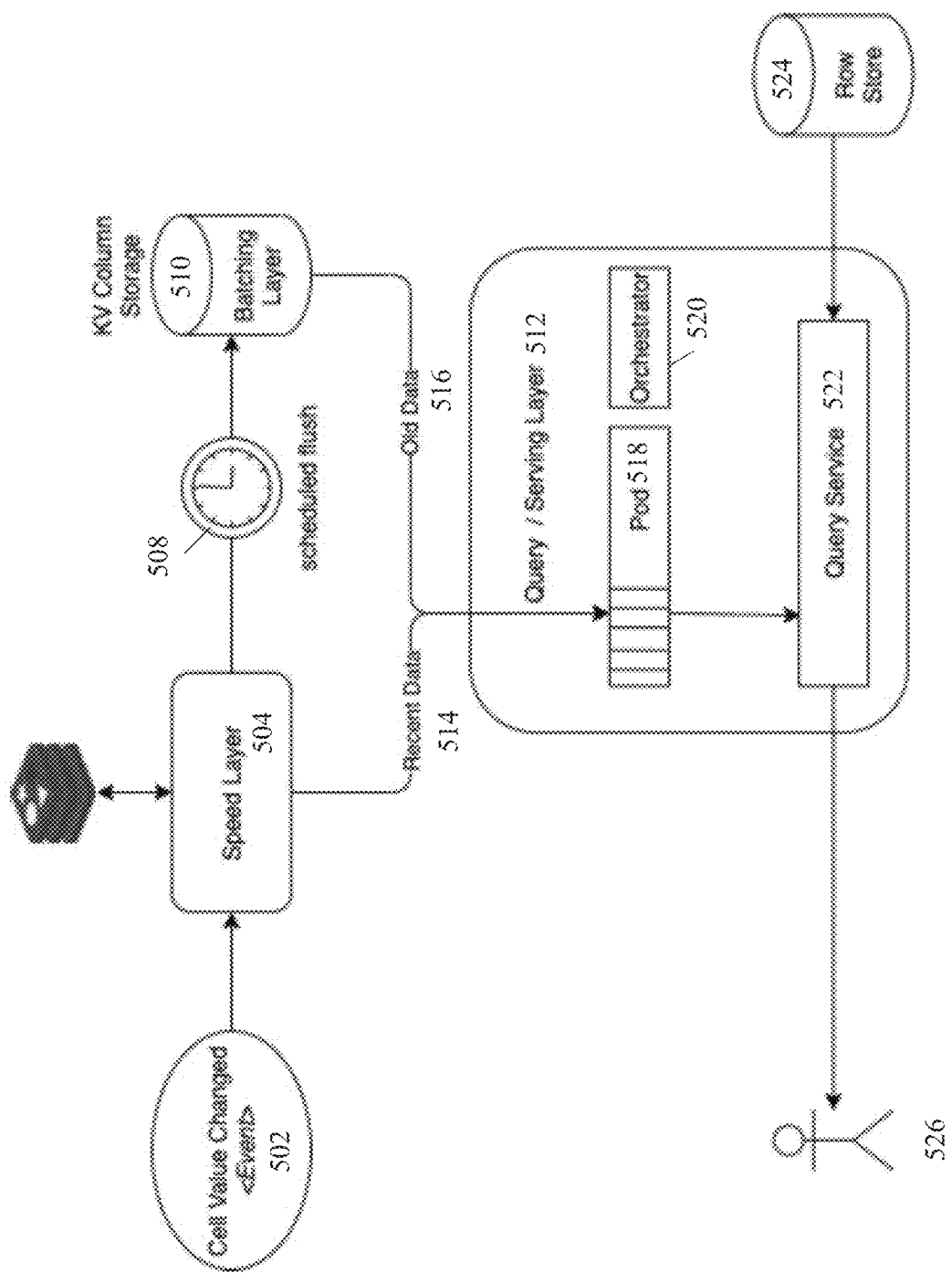
FIG. 5 is an exemplary dataflow for execution of a query on the dataset storing changes of cell values in a speed layer and a batching layer, in accordance with some embodiments of the present invention.
Figure 6:
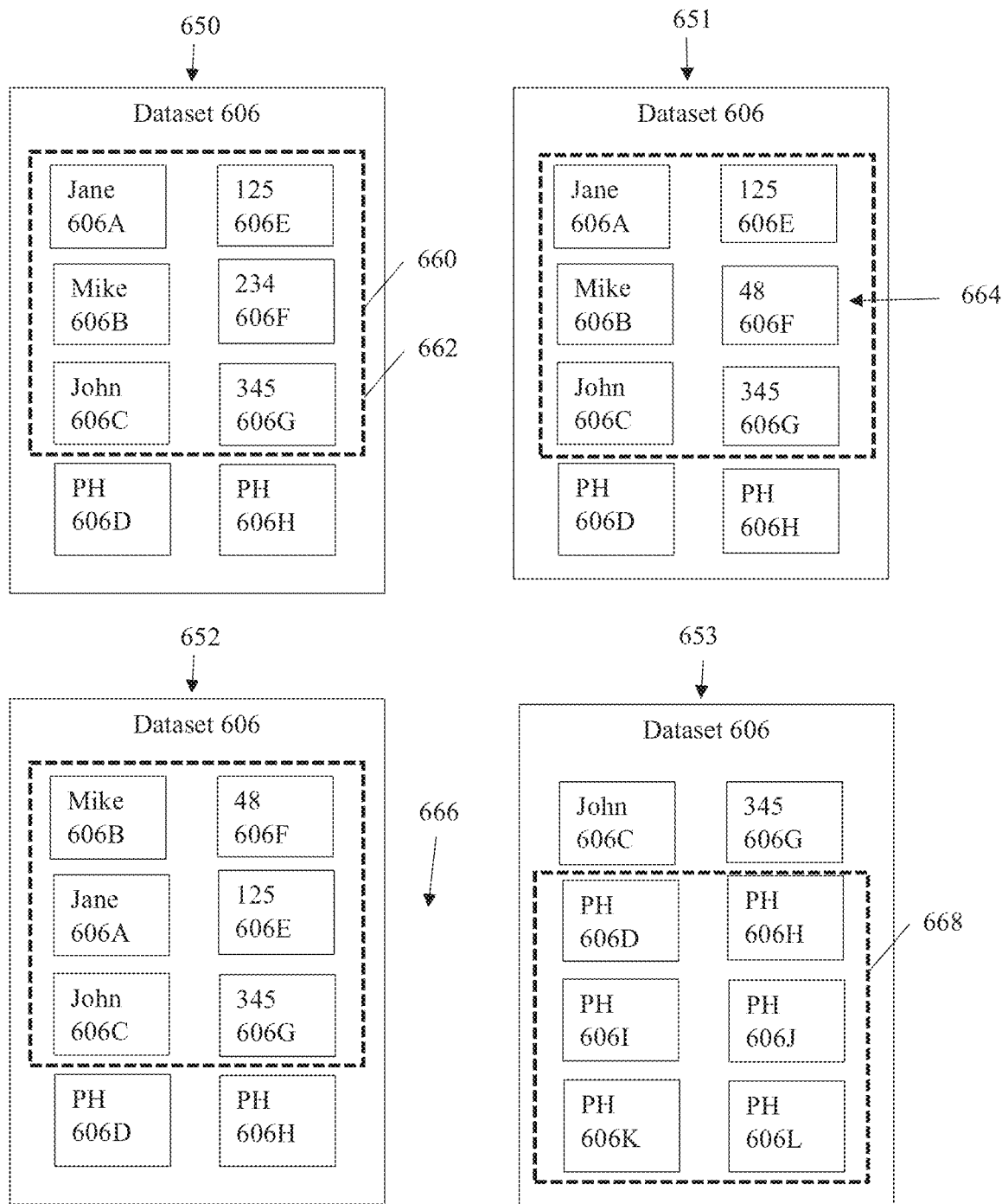
FIG. 6 is a schematic depicting pagination, updating of data, and scrolling by a client terminal, in accordance with some embodiments of the present invention.
Figure 6:
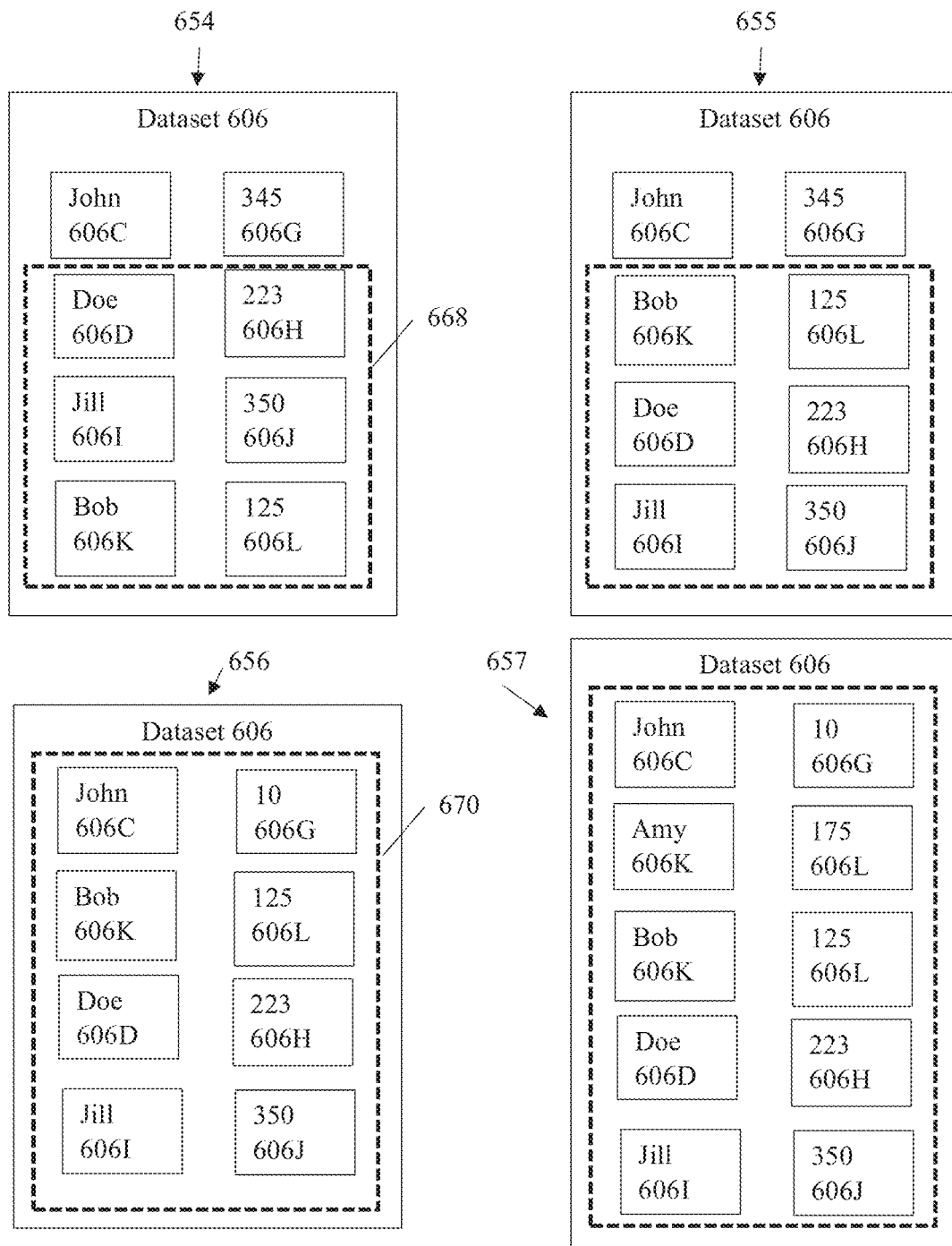
Figure 7:
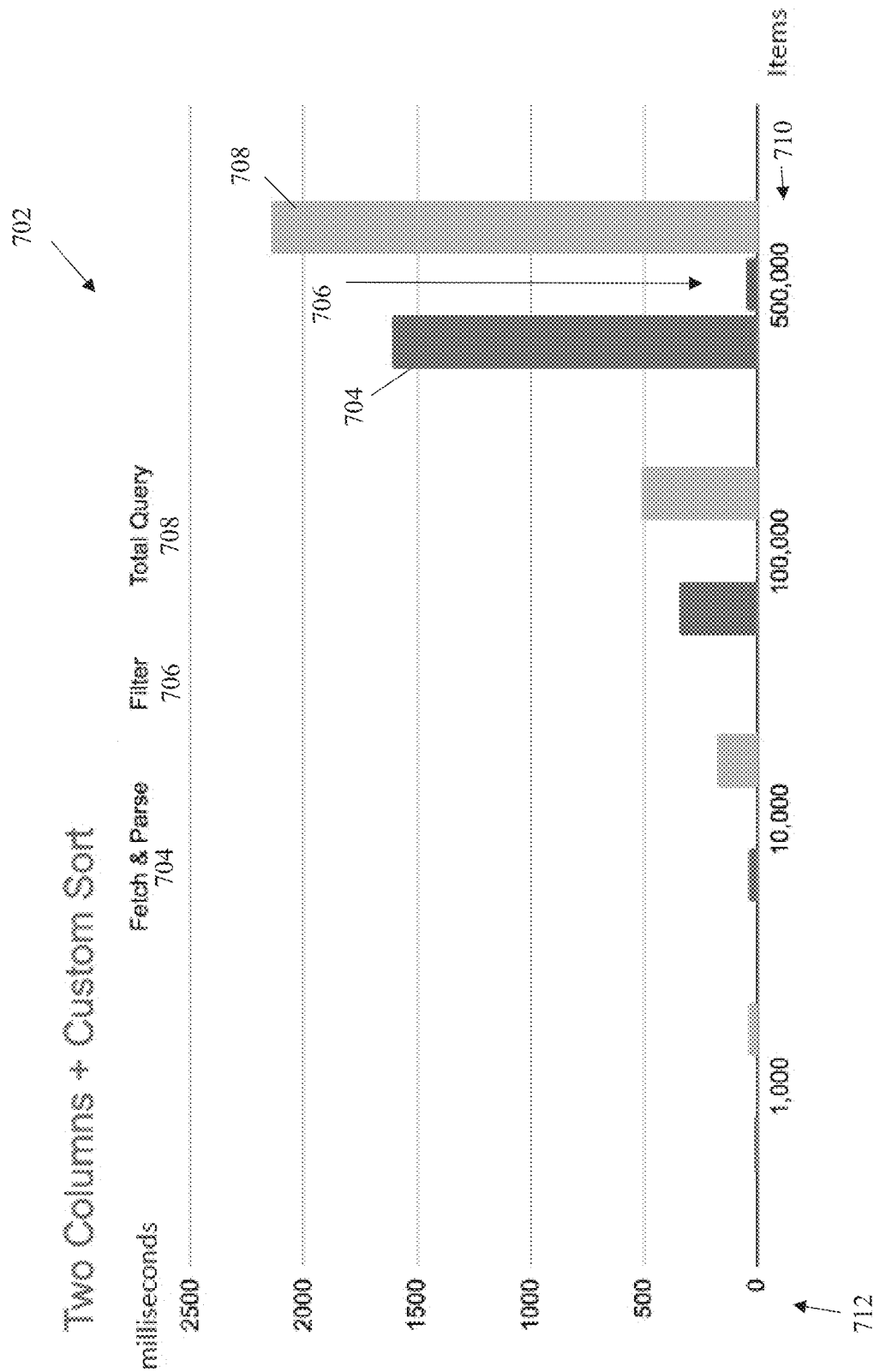
FIG. 7 is a graph depicting measurements made by Inventors as part of an experiment, to measure time it takes for a browser accessing a dataset managed by a server to present results, in accordance with some embodiments of the present invention.

Reference is now made to FIG. 1, which is a block diagram of a system for client-side updating and/or sort of a page of a dataset and/or scrolling of the dataset, in accordance with some embodiments of the present invention. Reference is also made to FIG. 2, which is a flowchart of a method of client-side updating and/or sort of a page of a dataset and/or scrolling of the dataset, in accordance with some embodiments of the present invention. Reference is also made to FIG. 3, which is a high level exemplary dataflow of exemplary triggers in response to a change in cell status, in accordance with some embodiments of the present invention. Features described with reference to FIG. 2 may represent exemplary details of portions of the flow described with reference to FIG. 3. Reference is now made to FIG. 4, which depicts examples of dependencies documented in the relational graph, in accordance with some embodiments of the present invention. Reference is now made to FIG. 5, which is an exemplary dataflow for execution of a query on the dataset storing changes of cell values 502 in a speed layer 504 and a batching layer 506, in accordance with some embodiments of the present invention. Reference is now made to FIG. 6, which is a schematic depicting pagination, updating of data, and scrolling by a client terminal, in accordance with some embodiments of the present invention. Reference is also to FIG. 7, which is a graph 702 depicting measurements made by Inventors as part of an experiment, to measure time it takes for a browser accessing a dataset managed by a server to present results, in accordance with some embodiments of the present invention.

System 100 may implement the acts of the method described with reference to FIGS. 2-7, by processor(s) 102 of a computing device 104 executing code instructions (e.g., code 106A) stored in a memory 106.

Computing device 104 may be implemented as, for example, one of more of: a server, and a computing cloud. Computing device 104 may include a single computing device, and/or a group of computing devices arranged in parallel.

Client terminal(s) 112 access one or more datasets stored and managed by computing device 104, optionally using a web browser 112A presenting the dataset on a user interface 108 (e.g., display). Client terminal(s) may be implemented, for example, as a mobile device, a stationary device, a kiosk, a smartphone, a laptop, a tablet computer, a wearable computing device, a glasses computing device, a watch computing device, and a desktop computer.

Client terminal(s) 112 request pages of the dataset from computing device 104. Client terminal(s) scroll across dataset, update the presented page of the dataset in near real time, merge pages, and/or sort the presented page of the dataset, as described herein.

Server(s) 110 may feed data into datasets stored and managed by computing device 104. Server(s) may be implemented as, for example, a network server, a web server, a storage server, a local server, a remote server, and a computing cloud.

Computing device 104 includes one or more processor(s) 102, implemented as for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 102 may be implemented as a single processor, a multi-core processor, and/or a cluster of processors arranged for parallel processing (which may include homogenous and/or heterogeneous processor architectures). It is noted that processor(s) 102 may be designed to implement in hardware one or more features stored as code instructions 106A.

Memory 106 stores code instructions executable by processor(s) 102, for example, a random access memory (RAM), dynamic random access memory (DRAM) and/or storage class memory (SCM), non-volatile memory, magnetic media, semiconductor memory devices, hard drive, removable storage, and optical media (e.g., DVD, CD-ROM). Storage device 106 stores, for example, one or more of: code 106A that implements one or more features and/or acts of the method described with reference to FIGS. 2-7 when executed by processor(s) 102.

Computing device 104 may include a data storage device 116 for storing data, for example, dataset repositories 116A, which include one or more datasets described herein, for example, one or more datasets of data setup by a user (e.g., a low level board of raw data, and a high level board linked the low level board for presenting real time aggregation summaries of the raw data), a relational graph(s) 116B that maps between dependent cells (e.g., mirror cells and cells being mirrored, mirror cells and formula cells), and other dataset described herein. Data repository 116 may be implemented as, for example, a memory, a local hard-drive, virtual storage, a removable storage unit, an optical disk, a storage device, and/or as a remote server and/or computing cloud (e.g., accessed using a network connection).

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 114 may be implemented as, for example, the internet, a local area network, a virtual private network, a wireless network, a cellular network, a local bus, a point to point link (e.g., wired), and/or combinations of the aforementioned.

Computing device 104 may connect using network 114 (or another communication channel, such as through a direct link (e.g., cable, wireless) and/or indirect link (e.g., via an intermediary computing unit such as a server, and/or via a storage device) with server(s) 110 and/or client terminal(s) 112.

Computing device 104 and each client terminal 112 may include and/or be in communication with one or more physical user interfaces 108 that include a mechanism for a user to enter data (e.g., enter filter, define automated task, link cells) and/or view data (e.g., the board), optionally within a GUI. Exemplary user interfaces 108 include, for example, one or more of, a touchscreen, a display, a keyboard, a mouse, and voice activated software using speakers and microphone.

Reference is now made to FIG. 2, at 202, the client terminal accesses a server to obtain a page of a dataset that includes multiple pages. The client terminal requests the page according to the portion of the dataset that the browser is about to present. For example, a set of rows and/or columns of the dataset. The dataset may be divided horizontally and/or vertically into pages.

The page division may be predefined by the server, with the browser merging pages. Alternatively, the page division may be determined according to the browser, for example, dynamically, according to requested data, such as requested rows.

The dataset from which the page is obtained may represent a snapshot of a dynamic dataset that is adapted. The snapshot may be stored in a cache, from which the page is provided. The snapshot may be prepared from a main dataset, for example, by applying a query, updates, and/or a sort operation.

The snapshot is not necessarily updated, but may be updated occasionally, for example, at predefined intervals and/or in response to events, such as a resynchronization command. The updates to the page performed by the client terminal are done independently of any updates of the snapshot. An update of the dataset by the server, may be triggered. The server may update the dataset by applying multiple update messages (which have also been sent to the client terminal, as in 208) in a non-real time manner, for example, every hour, or other event or other time interval, in contrast to the near real time update by the client terminal. The server may apply the update messages, optionally in a batch, that were received since a previous update of the dataset. The query operation may be replied to the dataset updated with the update messages. A new snapshot may be stored in the cache. Subsequent requests for pages from the client terminal are obtained from the snapshot of the updated dataset from the server.

The pages, other than the requested pages, are not sent to the client terminal in response to the request. Other pages may be sent later, if requested by the client terminal. This is noted to be in contrast to standard approaches where the entire dataset is sent to the client terminal in response to a request.

An indication of the other pages of the dataset is sent, rather than the actual data of the other pages. For example, an ID indicating which rows of the dataset exist but are not being sent. The indication is used to generate placeholders for the other pages, used for determining where the browser is scrolling the dataset without scrolling the actual data of the dataset. The placeholders may be generated by the browser and/or server.

The dataset(s) may be locally stored by the server. The dataset may include multiple records, each having multiple fields, implemented as cells. In an exemplary implementation, the dataset is implemented on a board, optionally as one or more tables, of cells. The records are implemented as rows of cells, and the fields are implemented as columns of cells.

At least some embodiments disclosed herein include devices, systems, and methods for collaborative work systems that may allow a user to interact with information in real time stored and/or presented in a dataset. At least some embodiments disclosed herein may allow a user to structure the dataset in many ways with the same building blocks to represent what the user wants to manage and how the user wants to manage it. This may be accomplished through the use of dataset(s).

A dataset may include a board and/or the dataset of the dataset may be presented in one or more boards. A board may include data from one or more datasets and/or other boards. A board may be a table with items, also referred to herein as "cells", (e.g., individual items presented in horizontal rows) defining objects or entities that are managed in the platform (task, project, client, deal, etc.). Unless expressly noted otherwise, the terms "dataset", "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. While a table view may be one way to present and manage the data contained on a board, a tables or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. Such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location, on a common board. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Cells may be linked to one another, on the same board, or on different boards, of the same dataset, and/or of different datasets. For example, a first cell may depend on a second cell. A third cell may depend on the second cell.

Cells may be mapped to mirror cells, which reflect changes to values of the cells from which they depend from.

Cells may be associated with a definition based on values of other cells, for example, a formula (mathematical equation based on values of other cells), an aggregation (e.g., what percentage of cells of a column have completed their calculations, and what percentage are stuck or still working, for example, 90% complete, and 10% stuck), and automation of task (e.g., send an email when all cells of a column have completed their calculations).

Mirror cells and cells with definitions may be different cells that are dependent on one another. Definition cells may be are dependent on mirror cells. For example, the mirror cell is dependent on multiple cells of another board, and the dependent cells obtains the values of the multiple cells from the mirror cells, on which a formula is applied, and/or an automation is applied.

Optionally, a monitoring dataset monitors a state of a certain cell for identifying whether the certain cell has completed calculations, and updates a dependent cell according to the monitoring.

Large complex boards may be defined, where some boards obtain data from other boards, cells are dependent on one another in complex links, and formulas and/or automations are applied, for example, to present dashboards summarizing data, and/or trigger automated tasks.

Optionally, the dataset (i.e., managed by the server) is implemented as a combination of a speed layer (i.e., dataset) and a batching layer (i.e., dataset). The speed layer documents accumulated changes to cells of the primary dataset occurring during a current time interval, for example, a current half hour, or hour, or 2 hours or 4 hours, or other time interval. The batching layer documents accumulated historical changes to cells of the primary dataset, i.e., that occurred before the current time interval. In response to the current time interval iteratively elapsing, the batching layer is iteratively updated with the accumulated changes documented by the speed layer. The speed layer may be reset. For example, every hour, the accumulated changes documented in the speed layer are combined with the accumulated changes documented in the batching layer. The speed layer documents and accumulates the new changes that occur during the next hour.

In response to a request from the client terminal to access a specific page of the dataset, a copy of the page is provided to the client terminal. The copy of the page is provided to the client terminal is obtained by computing real time values (e.g., of cells), as a combination of historical accumulated updates documented in the batching layer and recent accumulated changes documented in the speed layer. The copy of the page may be stored on a memory of the client terminal, for fast access by a browser running on the client terminal.

At 204, the received page is presented on a display of the client terminal, optionally within a window of a browser. A sort operation may be applied to the page. For example, sort by a certain column.

At 206, one or more update messages are received.

The update message may indicate, for example, a change in a value of a cell, an insertion of a new row, a deletion of an existing row, an insertion of a new column, a deletion of an existing column, and the like The update message may result in an unsorted state of the page, which requires re-execution of the sort operation, as described herein.

The changes may be due to the client terminal, another client terminal, the server, and/or an external entity (e.g., clock, external database feeding data). For example, the server monitors changes scheduled to occur to its own dataset, and sends the updated messages to the client terminal. In another example, another user using another client terminal manually changes a value in the dataset. The indication of the change is sent to the client terminal.

Exemplary updates may be a result of one or more: a direct a change of a value of the cell (e.g., user manually changes a value of the cell), an indirect change of the value of the cell due to a change of another cell linked to the cell (e.g., a cell computing a formula changes result when one of the input values from another cell changes), a configuration change impacting the cell (e.g., change in configuration of a column that includes the cell), a change in linkage of the cell (e.g., dependency on cell is changed), a change of time used for computation by the cell (e.g., clock sends trigger every hour), a change in entity assigned to the cell (e.g., assign to different user), a change in a definition of an automated task impacting the cell, and a forced recalculation of a formula impacting the cell.

The update message is evaluated to determine whether the update is destined for data within the currently presented page, or for another page, which is not currently presented and/or has not yet been obtained by the client terminal from the server, and for which there are placeholders. When the update message is for another page, the update message is stored, until the other page is reached by a scrolling operation (e.g., as described with reference to 212).

The page to which the update message is destined may be determined according to placeholders corresponding to a beginning and ending of each page of the dataset may be provided. The placeholders indicate the corresponding values of the pages of the dataset stored by the server. For example, for a dataset with sorted labelled rows, an update message for updating row 214 is destined to the page with beginning placeholder 200 and end placeholder 299.

Optionally, a determination is made that the update message is non-associated with an existing page having existing placeholders. For example, the update message is for updating row 214, however, there is a first page with end placeholder 200, and a subsequent second page starts with placeholder 300. In such a case, the update message is for a row on a page that does not exist, i.e., there is no page for rows 201-299. In response to the determination, the browser may merge pages using existing placeholders to create a merged page. The update message is allocated to the merged page. Following the previously discussed example, the first page is merged with the second page to create a merged page, and the update message is destined for updating the merged page.

The update message sent to the client terminal may be computed based from a combination of a real time value of a cell documented in the speed layer corresponding to the at least one new cell and a historical value of the cell documented in the batching layer corresponding to the at least one new cell.

In the case of multiple client terminals accessing the same dataset, the same update message is sent to each one of the client terminal. Each client terminal may be presenting a different page of the dataset and/or applying a different sort operation to the presented page. The same update messages may be applied at different times by each client terminal, according to when the page associated with the update message is presented on each display.

It is noted that the snapshot of the dataset managed by the server is not updated in near real time by the update messages, in contrast to the near real time updates by the browser of the client terminal. Updates may be performed occasionally, and/or as a batch, as described herein.

The server may access a relational graph to identify one or more dependent cells of another dataset, or the same dataset, dependent on a certain primary cell of the primary dataset. The page of the other dataset may be loaded on the client terminal. The update to the dependent cell may be computed in response to a change to the primary cell. The update message indicating the update to the dependent cell is sent to the client terminal.

It is noted that the update message may be for a certain cell, which is dependent on another cell, and is changed due to changes occurring in the cell from which it depends. There may be bidirectional dependencies between cells. A first unidirectional dependency defines which cell(s) is dependent on the cell that has changed value. For example, a first on a first board has changed. A second cell on a second board is set as a mirror that depends on the first cell. A second unidirectional dependency defines which cells the cell with the changed value is dependent on. For example, the first cell on the first board is dependent on a column of third cells of a third board. The first cell may be defined as an aggregation that summarizes what percentage of the column of third cells have completed computations. In other words, the bidirectional architecture maps relationships between parent and children. A certain cell may be a parent to one or more child cells, for example, mirror cells that monitor a certain cell. The same certain cell may be a child dependent on another parent cells, for example, the certain cell may be a mirror that monitors the parent cell.

The bidirectional dependencies provide the data that is used to compute the initial state of the dataset by the server. Updates to specific cells may be determined using unidirectional dependencies, according to which cell is changed.

Optionally, cell dependencies are obtained by accessing the relational graph (e.g., dataset, database). The relation graph may document the bidirectional dependencies. The relational graph may be implemented as two datasets, each documenting a respective unidirectional dependency. Alternatively, the relational graph is implemented as a single dataset that documents the bidirectional dependencies.

The relations graph may be implemented as a graph. Alternatively, the relational graph is converted to a key-value format, for example, by walking the graph, and defining each connection as an entry in a key-value database.

The key of the key-value dataset implementation of the relational graph may denotes an identifier of a specific column of cells. The value of the key-value dataset may denote the specific cell within the specific column. It is noted that the key-value implementation, where the key indicates columns, is different than other approaches where the key denotes a row, and the value denotes a cell within the row. The key-value implementation, where the key denotes the column, and the value denotes the row, is selected to provide scalability, computational efficiency, ability to be distributed, resiliency, and simplicity. The key-value architecture is quickly queried, and/or quickly updated, and/or may be stored in a distributed data storage system, enabling batch access to a large number of queries, and/or fast response for large number of results. Designating the key of the key-value dataset to denote the column (or specific field), and the value of the key-value dataset to denote the specific cell, provides computational efficiency and/or reduced latency, since the entire record does not need to necessarily be accessed, changed, and re-stored. Rather, the field of the record is accessed, changed, and re-stored.

The relational graph may be implemented on a distributed storage system designed for simultaneous batch access by multiple queries for identifying dependencies between cells. The distributed storage of the relational graph enables batch access to the graph, simultaneously (or near simultaneously) by multiple queries, which is computationally efficient and/or fast, in comparison to sequential access. Moreover, the distributed storage avoids a single point of failure, for example, where the entire dataset goes down if the relational graph fails.

Optionally, dependencies between cells may be stored at the column level, and at the row level, rather than on a cell to cell level. Such architecture provides scalability for dependencies, for example, where millions of dependencies are documented. If cell to cell dependencies were stored, a change to a single cell may require updating millions of links in the graph, which is not scalable for large datasets that include large number of links and/or not computationally efficient. In contrast, using the architecture described herein wherein links are defined at the column and row level, links may be updated using batches, which incurs lower latency and/or is more computationally efficient.

To obtain dependencies of a certain cell (e.g., which has changed), the relational graph may be accessed by applying a first query to the relational graph to obtain a set of columns linked to the certain cell. A second query is applied to the relational graph to obtain a set of rows linked to the certain cell. Dependent cells which are dependent on the certain cell are obtained by performing an intersection operation on the set of columns and the set of rows.

Additional optional exemplary details of using the relational graph for accumulating changes to the dataset(s) using a speed layer and a batching layer are described, for example, with reference to Application, which is co-filed with the present application, and incorporated herein by reference in its entirety.

Additional optional exemplary details of a batch update to the dataset(s) are described, for example, with reference to Application, which is co-filed with the present application, and incorporated herein by reference in its entirety.

At 208, the update is applied to the page currently presented by the browser, to create an updated page. The update is targeted towards specific parts of the page, for example, on a per cell basis. Values of the page presented on the display, which are not impacted by the update message, are maintained and not updated. The targeted update obtained by sending specific update messages provides computational efficiency to the client terminal and/or server sending the updates and/or to the network over which the updates are sent, in contrast to resending the entire dataset with small updates therein.

When a scroll is performed and a new page is presented on the display, the update is performed using previously obtained updates that have been queued but not yet applied (since the currently presented page was not yet presented).

Optionally, a synchronization is performed when update messages which have been sent have not yet been received by the client terminal, for example, when the client terminal has been closed or in sleep mode for a while, or when a communication network has been down and/or not available. The previously sent update messages that have not yet been received by a client terminal may be requested from a queue external to the client terminal, for example, from a server storing the update messages. The obtained previously sent update messages destined for the currently presented page are then applied to the currently presented page. Other obtained previously sent update messages destined for other non-presented pages may be stored, as described herein.

Optionally, the update of the page (e.g., a cell) is done by applying a diff operator to a previous value and to the respective change indicated by the update message. The diff operator considers the change, applied to the previous value. The diff operator may avoid re-computing the entire value (e.g., of the cell) using data that has not changed. Using the diff operator provides scalability, by improving computational efficiency of the processor (e.g., reduced processing resource utilization, reduced memory utilization, reduction in computations, and reduction in processing time). For example, aggregation may be performed using the diff operator. A mirror cell may monitor other cells to determine when the other cells have completed computing their tasks. At a certain point in time, 90% of the other cells being monitored may have completed their tasks, and 10% may be stuck. When the status of the remaining cells changes from stuck to done, the other cells do not need to be recomputed. A diff operation may be done on the existing data using the new data.

At 210, the sort operation, which has been previously applied to the presented page before the update, is re-executed on the page with applied update. The sorted updated page is presented. For example, when rows 200-250 are presented and sorted, and an update is done to row 210, the sort operation is reapplied to the page, which may cause row 210 to now be located between rows 234 and 235, rather than between rows 209-211 as before.

At 212, a scroll operation is applied, for example, by a user pressing a scroll bar on the window of the browser. The scroll operation may be up/down, and/or left/right.

The scroll operation is applied over the placeholders of the other pages, which are not stored yet on the client terminal since those pages have not yet been requested by the client terminal (unless some pages have been previously accessed, such as in a previous scroll operation).

At 214, one or more features described with reference to 202-212 are iterated. Different features may be implemented in subsequent iterations, based on actions taken during a preceding iteration. For example, to provide fast, real time updates to scrolling over a large dataset.

For example, in a current iteration, the scroll operation is applied in 212 to scroll to a new certain page. During a subsequent iteration, feature 202 is implemented in response to a stop of the scrolling on the new certain page defined by the placeholders. As described with reference to 202, the client terminal requests data of the new certain page from the server. The request to obtain the data of the page, and the providing of the data of the page by the server, is done according to the placeholders of the certain page. For example, the client terminal sends IDs of the rows of the beginning and end of the page. In 204, in response to receiving the data of the new certain page, the browser locally replaces the placeholders of the new certain page with the obtained data of the new certain page. The new certain page with replaced data is presented. Features described with reference to 206-210 are then implemented on the new certain page with replaced data. For example, when there are previously stored updated message destined for new certain page (e.g., obtained in 206 of preceding iterations), the updates of the update messages are applied (e.g., as in 208) to the page with replaced data. The sort is re-executed the on the updated page with replaced data (e.g., as in 210). The sorted updated page with replaced data is presented.

Referring now back to FIG. 6, schematic 650 depicts an initial state of dataset 606 as stored by the client terminal (e.g., browser). Window 660 depicts the page 662 of dataset 606 that is initially presented on the display of the client terminal. Page 662 is provided by the server in response to a request from the client terminal. Other data of other pages of the dataset stored by the server, which has not yet been sent to the client terminal, is represented by place holders (PH) 606D and 606H. PH 606D and 606H indicate that there are additional cells with data that may be requested by the client terminal.

Page 662 depicts a table of cells 606A-G, which may be received as sorted from the dataset of the server, and/or may be sorted by the browser of the client terminal. Page 662 includes three rows and two columns. The first column indicates names of people. The second column indicates a certain value associated with the respective person. Page 662 is sorted by the second column.

Schematic 651 indicates an update 664 applied to page 662. Update 664 changes the value of cell 606F (which is associated with "Mike" in cell 606B) from a previous value of 234 to a current value of 48.

Schematic 652 indicates a re-execution of the sort operation. The sort operation is applied to the rows of page 662.

The sort is not applied to other rows external to page 662, i.e., the sort is not applied to the placeholders (e.g., PH 606D and 606H).

Schematic 653 indicates a down scroll operation 666 of window 660 of schematic 652, to a new page 668. The scroll is done using the placeholders of dataset 606. I.e., page 668 includes placeholders 606D and 606H-L. The client terminal requests the data of page 668 from the server, according to placeholders 606D and 606H-L.

Schematic 654 depicts replacement of placeholders 606D and 606H-L of page 668 with actual values. The rows may be unsorted, such as when stored in an unsorted state by the server.

Schematic 655 depicts sort applied to the values of page 668 obtained from the server. It is noted that values presented on the display are sorted, while other values, external to the presented page (i.e., John 606C, 345 606G) are not sorted.

Now, another update message arrives, changing the value "345" 606G associated with "John" 606C, to "10".

Schematic 656 merging of "John" 606C "10" 606G of page 662 with page 668, to create a merged page 670. The entire page 662, or partial values thereof, may be merged with page 668. The merging of the pages is done in response to an update, to add a new record "Amy" 606K "75" 606L to dataset 606. Since the new record cannot be added to any existing page, but falls between the pages, the two pages are merged to create the merged page.

Schematic 657 depicts the new record added in a sorted manner to merged page 670.

Referring now back to FIG. 3, the flow described with reference to FIG. 3 depicts one or more of: accumulation of changes using a relational graph (e.g., as described with reference to Application No. 90516), locking of one or more columns that include dependent cells (e.g., as described with reference to Application No. 90514), and dynamic updating of cells impacted by the change that are presented within a browser window of a client terminal scrolling the dataset (e.g., as described herein).

Data flow 302 relates to determining dependent cells for updating in response to a change in status of a cell 304. Data flow 306 relates to accumulating changes to cells of the dataset. In flow 302, a change status of a cell 304 is received. Exemplary changes include, for example, a change in a value the cell, a configuration change (e.g., configuration of the column of the cell, such as presentation of values as dollars, which column to present), a change in linkage (e.g., board linkage, to/from mirror cell, to/from formula cell), entity change (e.g., user name changed), and time change (e.g., when formula is based on time). The change status may be, for example, in response to manual user input, in response to a cell performing a dynamic calculation (e.g., start of calculation, end of calculation), and in response to data obtained from an external source (e.g., sensor, external database, another board). At 306, the column of the cell is updated with the change. At 308, a dataset (e.g., database) 310 is updated with the change. At 312, one or more parameters are computed and/or set for the cell, using the updated value from 306, and/or using definitions of the parameters, using and/or historical values 314 obtained from the dataset 310. Examples of parameters calculated for the cell include: whether the cell has completed its calculations or not (e.g., True or False), color of the cell presented within a browser of a client terminal (e.g., dependent on whether calculations have been done or not, for example, green when done, red when not done), and version (e.g., sequentially documenting changes to the cell). The calculated values may be stored in a calculated items dataset (e.g., database) 350. At 316, one or more dependent cells, of one or more columns, of the same board and/or other boards, are updated according to the change in cell status 304. The dependent cells that are updated are determined according to a relational graph (e.g., database) 318, which maps dependencies between cells, as described herein. At 320, event messages indicating the updates for the dependent cells may be created and sent to the client terminal for updating viewed pages, as described herein. At 322, columns of the dataset that include the dependent cells are updated, optionally using the events in the respective queue 320. The updating may be done by locking each receptive column as a whole, and applying multiple changes to multiple cells within the column (from the respective queue) during the same locking session, as described with reference to Application No. 90514.

At 324, the updated cell is accumulated and documented. The updated cell value 326 is documented in a speed layer 328, that documents changes and/or updates to cells of the dataset within a recent time interval (e.g., last hour, last half hour, last 2 hours, or other values). A timer 330 may trigger updating of a batching layer 332 with the contents of speed layer 328. For example, when a time threshold is met, such as when an hour during which speed layer 328 has been updated has passed, the values of speed layer 328 are used to update historical values of batching layer 332. Batching layer 332 documents historical changes of cells of the dataset, from inception until the most recent time threshold (e.g., current hour). Batching layer 332 may be implemented as a key-value database (e.g., implemented in Cassandra) 334, as described herein.

Referring now back to FIG. 4, dependencies may be between cells, and/or between cells and other entities, such as users, configurations, and timers. Four exemplary boards 402A-D with respective cells are depicted. It is noted that board 402D has not dependencies currently documented in the relational graph. Dependency line 404 indicates that a mirror cell 406 of board 402C monitors cell 408 of board 404A. Dependency line 410 indicates that a mirror cell 406 of board 402C monitors cell 412 of board 404B. Dependency line 412 indicates that a people cell 414 is dependent on a user entity. Formula cell 416 has multiple dependencies, indicates by dependency line 418 indicating dependency on people cell 414, dependency line 420 indicating dependency on date cell 422, dependency line 422 indicating dependency on mirror 406 (which is dependent on cell 408 of board 402A via dependency line 404 and on cell 412 of board 402B via dependency line 410), dependency line 424 indicating dependency on column configuration 426, and dependency line 428 indicating dependency on a timer 430 (e.g., that provides a current time).

Referring now back to FIG. 5, an event indicating a change in a value of a cell 502 of a dataset is obtained. Speed layer 504, which documents and accumulates recent changes within a current time interval (e.g., current hour) is updated. A scheduled flush 506 is performed, for example, at preset intervals, for example, every hour. The accumulated changes of speed layer 504 are added to batching layer 508, which documents and accumulates historical changes prior to the current scheduled flush. Batching layer 508 is stored as a key-value dataset, where each key indicates a certain column of the dataset, and each value indicates the cell within the column. Updates indicating changes may be sent to the client terminal, as described herein.

A query/serving layer 512 receives a query for execution on the dataset. The query may be from the client terminal, to obtain values of a page of the dataset. The query is executed on the last update state of the dataset, which is represented as a combination of the current state of the speed layer, i.e., recent data 514, and the batching layer, i.e., old data 516. Recent data 514 and old data 516 may be fed into a point of delivery (POD) 518. The real time dataset and/or page is created by combining recent data 514 (indicating recent changes to cells of the dataset) and old data 516 (indicating historical changes to cells of the dataset), optionally by an orchestrator 520. Query service 522 may executes the query twice. First, on the real time dataset (created from the combination of recent data 514 and old data 516), which is represented as key-values indicating columns, to obtain columns. The query is then executed on a row store 524 to obtain rows. The column result is intersected with the row result to obtain cells in response to the query, which are provided to the user 526 (i.e., the client terminal used by the user).

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non limiting fashion.

Referring now back to FIG. 7, four experiments were performed, using a dataset with two columns and a custom sort. During each experiment, three measurements were made: fetch and parse 704, filter 706, and total query 708. X-axis 710 indicates the increasing number of cell (i.e., items) of the dataset used in each experiment, i.e., 1000, 10000, 100000, and 500000. Y-axis 712 indicates the response time in milliseconds. As seen in graph 702, the response time remains reasonable even for datasets with 500000 cells. This enables fast scrolling by the browser, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant datasets will be developed and the scope of the term dataset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for providing scalability to client terminals of a client-side updating and sorting of a page of a dataset, comprising:
   at least one processor of a client terminal executing a code for accelerating a performance of the client terminal and reducing traffic between at least one server which stores and sorts a dataset, and the client terminal accessing the dataset on the at least one server, said reduction is achieved by transferring updates of said dataset from said at least one server to said client terminal and performing local re-sorting on said client terminal, by:
      accessing the at least one server to obtain a portion of the dataset, wherein the dataset is structured as a board comprising a plurality of data cells storing values and arranged in a plurality of table columns and plurality of table rows and is sorted by the at least one server according to a sort operation of sorting at least one of the columns and rows of the board, wherein said portion comprising a sub-table of said board, wherein a size of said portion is determined according to displaying capabilities of said client terminal, wherein said portion is defined as a page and wherein data cells not included in said portion are not provided to the client terminal;
      presenting the page on a display of the client terminal;
      receiving at least one update message for updating of a value of at least one data cell of the dataset, regardless of whether said at least one data cell is included in said portion or not included in said portion;
      receiving from the at least one server, an indication of the data cells not included in said portion;
      for each data cell of the at least one data cell, that is included in the page:
         applying the update to the page to create an updated page,
         re-executing the sort operation of sorting the at least one of the columns and rows on the portion of the board which is included in the updated page, and
         presenting the sorted updated page; and
      for the data cells of the at least one data cell, not included in said portion, generating placeholders and storing said generated placeholders on said client terminal;
   wherein a same update message is sent to each one of a plurality of client terminals, wherein each of the plurality of client terminals presenting a different page representing a respective different portion of the dataset and/or applying a different sort operation sorting at least one of the columns and rows of the respective presented sorted updated page.

2. The system of claim 1, further comprising code for:
   receiving from the at least one server an indication of other pages which are different from the page and which the data cells of the other pages are not included in said portion;
   generating placeholders for said other pages and storing said placeholders of said other pages on said client terminal;
   scrolling the placeholders of the other pages; and
   in response to a stop of the scrolling on a certain page represented by placeholders, obtaining data of the certain page from the at least one server according to the placeholders of the certain page,
   replacing data of the placeholders of the certain page with the obtained data of the certain page; and
   presenting the certain page with replaced data.

3. The system of claim 2, wherein the presenting the page, the receiving the at least one update, the applying the update, the re-executing the sort, and the presenting the sorted, are performed on the certain page with replaced data.

4. The system of claim 2, further comprising code for:
   storing an update message indicating an update for a data cell not obtained by the client terminal and having placeholders,
   determining when the stored update message is for the certain page with replaced data,
   applying the update to the certain page with replaced data,
   re-executing the sort on the updated page with replaced data, and
   presenting the sorted updated certain page with replaced data.

5. The system of claim 4, wherein placeholders corresponding to a beginning and ending of pages of the dataset indicate the corresponding values of the pages of the dataset stored by the at least one server, and wherein the page associated with the update messages is determined according to the values of the beginning and ending of pages.

6. The system of claim 5, further comprising code for:
   in response a determination that the update message is non-associated with an existing page having existing placeholders, merging pages using existing placeholders to create a merged page, and allocating the update message to the merged page.

7. The system of claim 4, wherein the dataset is not updated in near real time by the at least one update message.

8. The system of claim 1, further comprising code for triggering an update of the dataset by the at least one server, wherein the at least one server updates the dataset by applying a plurality of update messages since a previous update, and applying a query and/or sort operation to the dataset updated with the update messages, where the client terminal obtains pages of the updated dataset from the at least one server.

9. The system of claim 1, further comprising code for performing a synchronization, by obtained previously sent update messages that have not yet been received by a client terminal from a queue external to the client terminal, and applying the obtained previously sent update messages.

10. The system of claim 1, wherein values of the page presented on the display, which are not impacted by the at least one update message, are maintained and not updated.

11. The system of claim 1, wherein the dataset comprises a snapshot of a main dataset stored in a cache on the client terminal.

12. The system of claim 11, wherein the dataset is prepared by applying at least one of a query, an update, and a sort operation to the main dataset.

13. The system of claim 1, wherein said presenting the page and/or said presenting the sorted updated page comprises using at least one dashboard for the presentation.

14. The system of claim 1, wherein the dataset hosted by the at least one server is managed as a combination of a speed layer and a batching layer, the speed layer documenting accumulated changes to cells occurring during a current time interval, the batching layer documenting accumulated historical changes to cells, wherein in response to a current time interval iteratively elapsing, the batching layer is iteratively updated with the accumulated changes documented by the speed layer.

15. The system of claim 14, wherein in response to a request from the client terminal to access a page of the dataset, the page of the dataset is provided to the client terminal by computing real time values of cells as a combination of historical updates documented in the batching layer and recent changes documented in the speed layer.

16. The system of claim 14, wherein the at least one update message sent to the client terminal is computed from a combination of a real time value of a cell documented in the speed layer corresponding to the page and a historical value of the cell documented in the batching layer corresponding to the page.

17. The system of claim 1, wherein the at least one server is configured for accessing a relational graph to identify at least one second cell of at least one second dataset dependent on the at least one first cell of the dataset,
    wherein a page of the at least one second dataset is loaded on the client terminal; and
    computing an update to the at least one second cell in response to a change to the at least one first cell,
    wherein the at least one update message comprising the update to the at least one second cell is sent to the client terminal.

18. The system of claim 17, wherein the change to the at least one first cell is selected from a group consisting of: direct a change of a value of the first cell, an indirect change of the value of the first cell due to a change of another cell linked to the first cell, a configuration change impacting the first cell, a change in linkage of the first cell, a change of time used for computation by the first cell, a change in entity assigned to the first cell, a change in a definition of an automated task impacting the first cell, and a force recalculation of a formula impacting the first cell.

19. A method for providing scalability to client terminals of a client-side updating and sorting of a page of a dataset, comprising accelerating a performance of the client terminal and reducing traffic between at least one server which stores and sorts said dataset, and the client terminal accessing the dataset on the at least one server, wherein said dataset is structured as a board comprising a plurality of data cells storing values and arranged in a plurality of table columns and plurality of table rows, said reduction is achieved by transferring updates of said dataset from said at least one server to said client terminal and performing local re-sorting on said client terminal, by:
    accessing the at least one server to obtain a portion of the dataset, wherein said portion comprising a sub-table of said board, wherein the dataset is sorted by the at least one server according to a sort operation of sorting at least one of the columns and rows of the board, wherein a size of said portion is determined according to displaying capabilities of said client terminal, wherein said portion is defined as a page and wherein data cells not included in said portion are not provided to the client terminal;
    presenting the page on a display of the client terminal;
    receiving at least one update message for updating of a value of at least one data cell of the dataset, regardless of whether said at least one data cell is included in said portion or not included in said portion;
    receiving, from the at least one server, an indication of the data cells not included in said portion;
    for each data cell of the at least one data cell, that is included in the page:
    applying the update to the page to create an updated page,
    re-executing the sort operation of sorting the at least one of the columns and rows on the portion of the board which is included in the updated page, and presenting the sorted updated page; and
    for the data cells of the at least one data cell, not included in said portion, generating placeholders and storing said generated placeholders on said client terminal,
    wherein a same update message is sent to each one of a plurality of client terminal, wherein each of the plurality of client terminals presenting a different page representing a respective different portion of the dataset and/or applying a different sort operation sorting at least one of the columns and rows of the respective presented sorted updated page.

20. A non-transitory medium storing program instructions for providing scalability to client terminals of a client-side updating and sorting of a page of a dataset, which, when executed by at least one hardware processor of a client, cause the at least one processor to accelerate a performance of the client terminal and to reduce traffic between at least one server which stores and sorts said dataset, and the client terminal accessing the dataset on the at least one server, said reduction is achieved by transferring updates of said dataset from said at least one server to said client terminal and performing local re-sorting on said client terminal, by:
    accessing the at least one server to obtain a portion of the dataset, wherein the dataset is structured as a board comprising a plurality of data cells storing values and arranged in a plurality of table columns and plurality of table rows and is sorted by the at least one server according to a sort operation of sorting at least one of the columns and rows of the board, wherein said portion comprising a sub-table of said board, wherein a size of said portion is determined according to displaying capabilities of said client terminal, wherein said portion is defined as a page and wherein data cells not included in said portion are not provided to the client terminal;
    presenting the page on a display of the client terminal;
    receiving at least one update message for updating of a value of at least one data cell of the dataset, regardless of whether said at least one data cell is included in said portion or not included in said portion;
    receiving, from the at least one server an indication of the data cells not included in said portion;
    for each data cell of the at least one data cell, that is included in the page:
    applying the update to the page to create an updated paged,
    re-executing the sort operation of sorting the at least one of the columns and rows on the portion of the board which is included in the updated page, and presenting the sorted updated page; and
    for the data cells or the at least one data cell, not included in said portion, generating placeholders and storing said generated placeholders on said client terminal;
    wherein a same update message is sent to each one of a plurality of client terminal, wherein each of the plurality of client terminals presenting a different page representing a respective different portion of the dataset and/or applying a different sort operation sorting at least one of the columns and rows of the respective presented sorted updated page.

\* \* \* \* \*